United States Patent
Chabanne et al.

(10) Patent No.: US 11,574,180 B2
(45) Date of Patent: Feb. 7, 2023

(54) METHODS FOR LEARNING PARAMETERS OF A CONVOLUTIONAL NEURAL NETWORK, AND CLASSIFYING AN INPUT DATUM

(71) Applicant: IDEMIA IDENTITY & SECURITY FRANCE, Courbevoie (FR)

(72) Inventors: Herve Chabanne, Courbevoie (FR); Vincent Despiegel, Courbevoie (FR); Anouar Mellakh, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 987 days.

(21) Appl. No.: 16/247,884

(22) Filed: Jan. 15, 2019

(65) Prior Publication Data
US 2019/0220743 A1    Jul. 18, 2019

(30) Foreign Application Priority Data
Jan. 15, 2018 (FR) ........................ 1850304

(51) Int. Cl.
*G06N 3/08* (2006.01)
*G06N 3/04* (2006.01)
*G06N 3/063* (2006.01)
*G06K 9/62* (2022.01)

(52) U.S. Cl.
CPC ............. *G06N 3/08* (2013.01); *G06K 9/6267* (2013.01); *G06N 3/0454* (2013.01); *G06N 3/0481* (2013.01); *G06N 3/063* (2013.01)

(58) Field of Classification Search
CPC ...... G06N 3/08; G06N 3/0454; G06N 3/0481; G06N 3/063; G06K 9/6267
See application file for complete search history.

(56) References Cited

FOREIGN PATENT DOCUMENTS

CN      107491787 A      12/2017
WO      2016/118206 A2   7/2016

OTHER PUBLICATIONS

Alvarez et al., "On the efficient representation and execution of deep acoustic models", arXiv preprint arXiv:1607.04683, 2016—arxiv.org (Year: 2016).*
Zhou et al., "DoReFa-Net: Training Low Bitwidth Convolutional Neural Networks with Low Bitwidth Gradients", arXiv, Feb. 2, 2018, pp. 1-13.
Wyseur, Brecht, "White-Box Cryptography", PhD thesis, Katholieke Universiteit Leuven, 2009, 205 pages.

(Continued)

*Primary Examiner* — Qian Yang
(74) *Attorney, Agent, or Firm* — Womble Bond Dickinson (US) LLP

(57) ABSTRACT

The present invention relates to a method for learning parameters of a convolutional neural network, CNN, for data classification, the method comprising the implementation, by means for processing data (11) of a server (1), of steps consisting of:
(a1) Learning, from an already classified learning database, the parameters of a CNN, called quantized CNN, such that said parameters are valued in a discrete space;
(a2) Generating a white-box implementation of at least one layer of said quantized CNN, said white-box implementation being predetermined based on at least one of said learned parameters.

Figure 1:
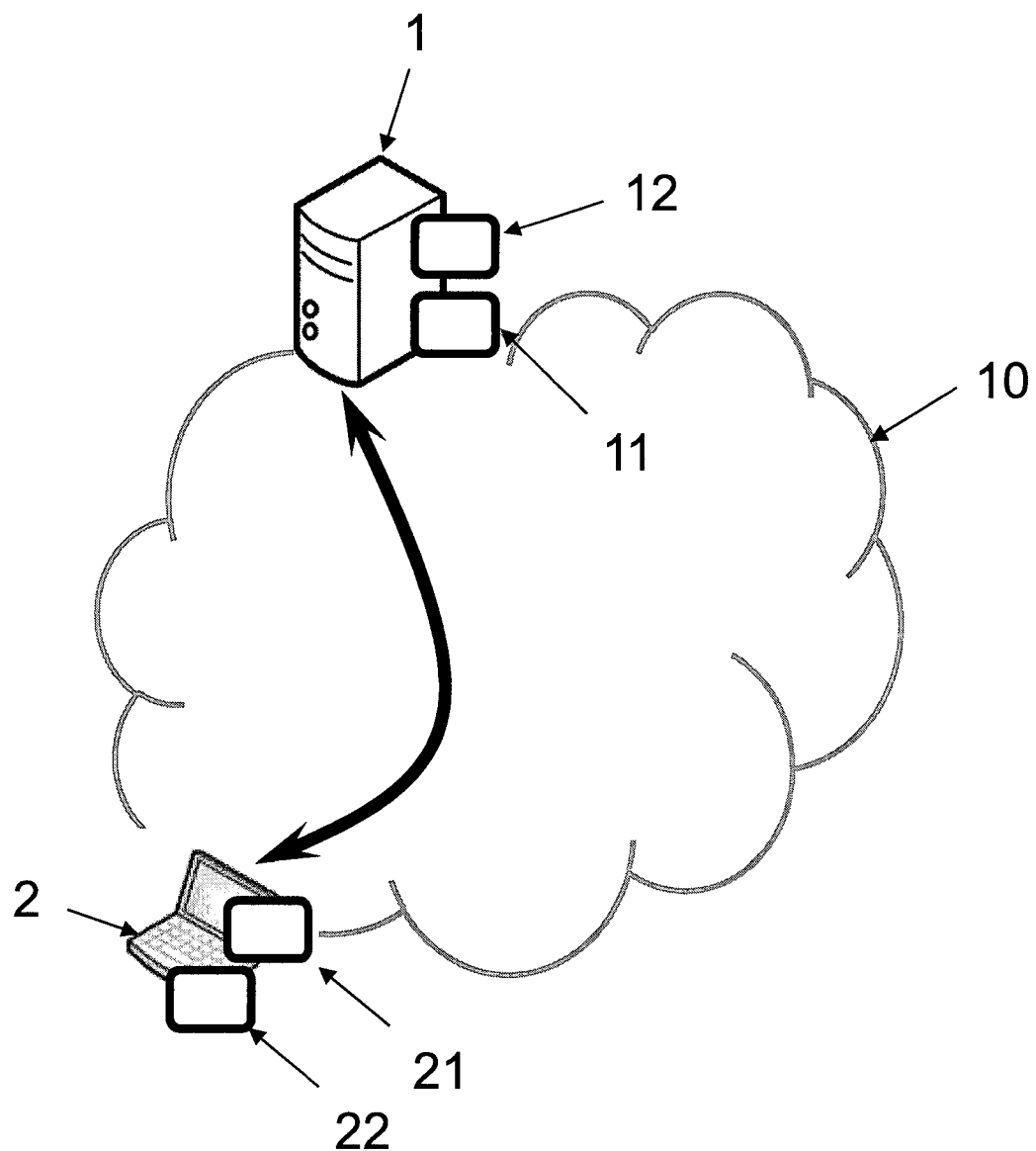

The present invention also relates to a method for classifying an input datum.

12 Claims, 4 Drawing Sheets

(56) References Cited

OTHER PUBLICATIONS

Tang et al., "How to Train a Compact Binary Neural Network with High Accuracy?", Proceedings of the Thirty-First AAAI Conference on Artificial Intelligence (AAAI-17), AAAI 2017, pp. 2625-2631.
Sanfelix et al., "Unboxing the White-Box Practical attacks against Obfuscated Ciphers", Riscure, 2015, 38 pages.
Rastegari et al., "XNOR-Net: ImageNet Classification Using Binary Convolutional Neural Networks", Computer Vision—ECCV 2016: 14th European Conference Proceedings, Part IV, ECCV, 2016, pp. 525-542.
Preliminary Research Report received for French Application No. 1850304, dated Nov. 16, 2018, 4 pages (1 page of French Translation Cover Sheet and 3 pages of original document).
Long et al., "Fully Convolutional Networks for Semantic Segmentation," arXiv, 2014, pp. 3431-3440.
Ioffe et al., "Batch Normalization: Accelerating Deep Network Training by Reducing Internal Covariate Shift", arXiv, Mar. 2, 2015, pp. 1-11.
Howard et al., "MobileNets: Efficient Convolutional Neural Networks for Mobile Vision Application", arXiv, Apr. 17, 2017, 9 pages.
Chow et al., "White-Box Cryptography and an AES Implementation", In the post-proceedings of the 9th Annual Workshop on Selected Areas in Cryptography (SAC'02), Aug. 15-16, 2002, pp. 1-18.
Chow et al. "A White-Box DES Implementation for DRM Applications", Pre-proceedings for ACM DRM-2002 workshop, Oct. 15, 2002, pp. 1-16.
Anwar et al., "Fixed point optimization of deep convolutional neural networks for object recognition", 2015 IEEE International Conference on Acoustics, Speech and Signal Processing (ICASSP), 2015, pp. 1131-1135.
Abadi et al., "Learning to protect Communications with Adversarial Neural Cryptography", arXiv, Oct. 2016, pp. 1-15.

* cited by examiner

METHODS FOR LEARNING PARAMETERS OF A CONVOLUTIONAL NEURAL NETWORK, AND CLASSIFYING AN INPUT DATUM

GENERAL TECHNICAL FIELD

The present invention relates to the field of supervised learning, and in particular to methods for learning parameters of a convolutional neural network, or classifying an input datum by means of a convolutional neural network.

STATE OF THE ART

Neural networks are massively used for data classification.

After an automatic learning phase (usually supervised, that is to say on an already classified reference database), a neural network "learns" and becomes by itself capable of applying the same classification to unknown data.

Convolutional neural networks or CNNs are a type of neural network in which the connection pattern between the neurons is inspired by the visual cortex of animals. They are thus particularly adapted to a particular type of classification which is the image analysis, they indeed effectively enable the recognition of objects or persons in images or videos, in particular in security applications (automatic monitoring, threat detection, etc.).

They are increasingly deployed directly on personal computers or even mobile terminals.

Today, CNNs are fully satisfactory, but in view of their security—oriented applications, it would be desirable to secure them.

More precisely, a CNN is defined both by parameters obtained at the end of a learning phase and by predetermined hyperparameters (in both cases weights and biases). The parameters and especially the hyperparameters constitute sensitive data that should be treated in the same way as the parameters called secret parameters of a cryptographic function. In the remainder of the description, the parameters as well as the hyperparameters will be, for convenience, referred to as parameters of a CNN.

Generally, a function is considered to be a "black box" when its internal functioning cannot be accessed, i.e. when its inputs and outputs can be known, but not its secret parameters or intermediate states.

The black box assumption imposes a strong constraint on the storage and manipulation of these parameters. However, tools have been recently published to allow the automation of attacks on hardware implementation, called auxiliary channel attacks or fault attacks.

Today, for many use cases including the implementation on mobile terminals, it is necessary to deploy cryptographic algorithms with the least possible assumptions about the security of the target hardware. The secure storage and manipulation of the secret parameters must then be ensured at the application level.

The same work needs to be done for the CNNs so as to prevent the parameters from being extracted and misused if the devices on which they are deployed have vulnerabilities.

The cryptography called white box cryptography aims at answering this challenge for cryptographic algorithms by proposing implementations that are supposed to make the extraction of secrets impossible, even in case of attack allowing the attacker to have full access to the software implementation of the algorithm. More precisely, a function is considered to be a "white box" when its mechanisms are visible and allow understanding the functioning therefrom. In other words, it is directly assumed that the attacker has access to everything he wants (the binary is completely visible and modifiable by the attacker and the latter has full control on the execution platform). Consequently, the implementation itself is the only line of defense. We refer to "white-box implementation" of an elementary calculation of the algorithm when we manage to represent this calculation in a secure form avoiding having the keys used in clear format, for example by representing the calculation by a table stored in memory.

However, these white-box implementation techniques are as such not usable on the CNNs. In particular, the sizes of the required tables are colossal, and unsuitable for devices such as mobile terminals on which the white-box implementation is desirable, such devices generally having fewer resources.

It would be therefore desirable to have a new solution for learning the parameters of a CNN/data classification using the CNN that is fully compatible with a white-box implementation and does not limit the size or efficiency of the CNN.

PRESENTATION OF THE INVENTION

According to a first aspect, the present invention relates to a method for learning parameters of a convolutional neural network, CNN, for data classification, the method comprising the implementation, by means for processing data of a server, of steps consisting of:

(a1) Learning, from an already classified learning database, the parameters of a CNN, called quantized CNN, such that said parameters are valued in a discrete space;

(a2) Generating a white-box implementation of at least one layer of said quantized CNN, said white-box implementation being predetermined based on at least one of said learned parameters.

According to other advantageous and non-limiting features:

the parameters of the quantized CNN are valued in space $\{0; 1\}^n$ with $n \leq 8$ n is equal to 1, 2 or 4;

the quantized CNN does not comprise a fully connected layer;

the quantized CNN comprises at least one convolution layer, said white-box implementation is a white-box implementation of at least one convolution layer;

the CNN further comprises a non-linear layer following the convolution layer, said white-box implementation is a white-box implementation of at least one convolution layer and one non-linear layer;

the CNN is called CNN with separable convolutions, and comprises first convolution layers implementing a single filter per input channel, and second convolution layers each combining the outputs of a first convolution layer.

According to a second aspect, the present invention relates to a method for classifying an input datum, characterized in that it comprises the implementation of steps consisting of:

(b) Storing, on means for storing data of a terminal, a white-box implementation of at least one layer of a convolutional neural network, CNN, called quantized CNN, having parameters valued in a discrete space, said white-box implementation being predetermined based on at least one of said parameters;

(c) Classifying, by the means for processing data of the terminal, said encrypted input datum, by means of the quantized CNN, by applying said white-box implementation.

According to other advantageous and non-limiting features, the classification method comprises a prior step (a) of learning said quantized CNN in accordance with the learning method according to the first aspect.

According to a third and a fourth aspect, the invention proposes a computer program product comprising code instructions for the execution of a method, according to the first or the second aspect, for learning parameters of a convolutional neural network, CNN, or classifying an input datum; and a storage means readable by a computer device on which a computer program product comprises code instructions for the execution of a method, according to the first or the second aspect, for learning parameters of a convolutional neural network, CNN, or classifying an input datum.

PRESENTATION OF THE FIGURES

Figure 2A:
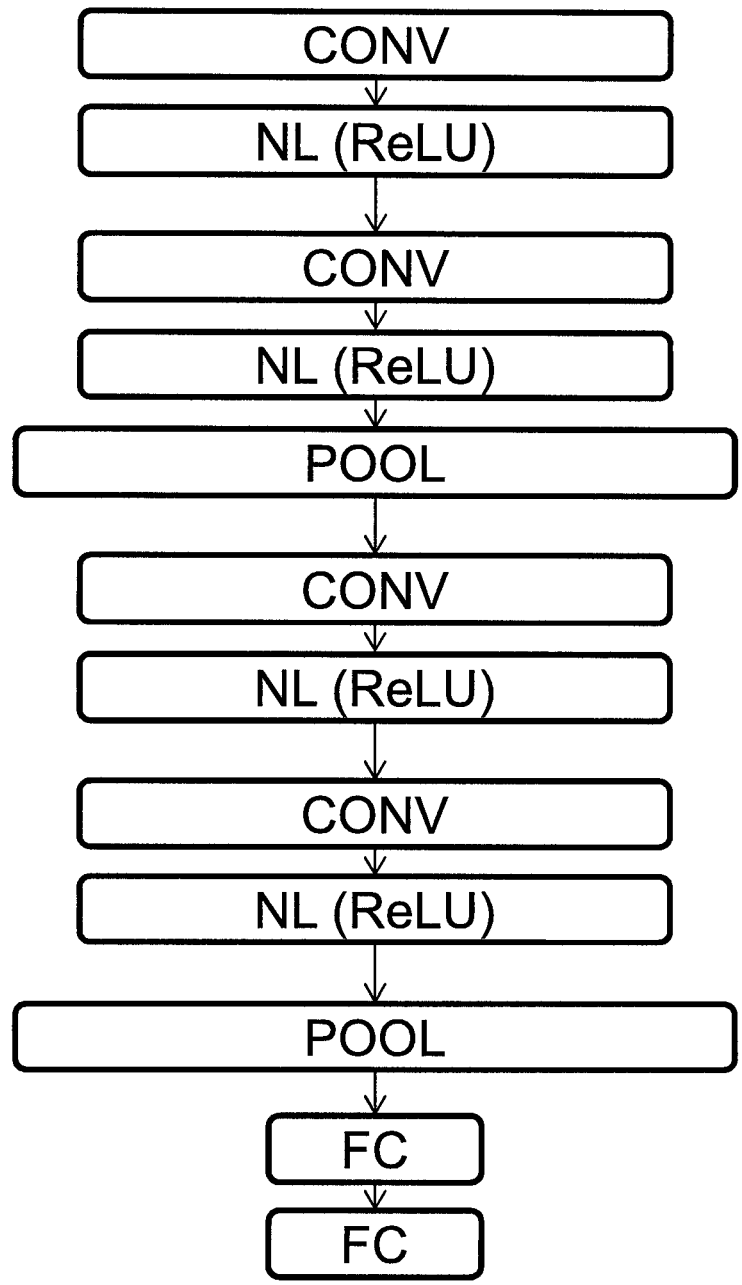
Figure 2B:
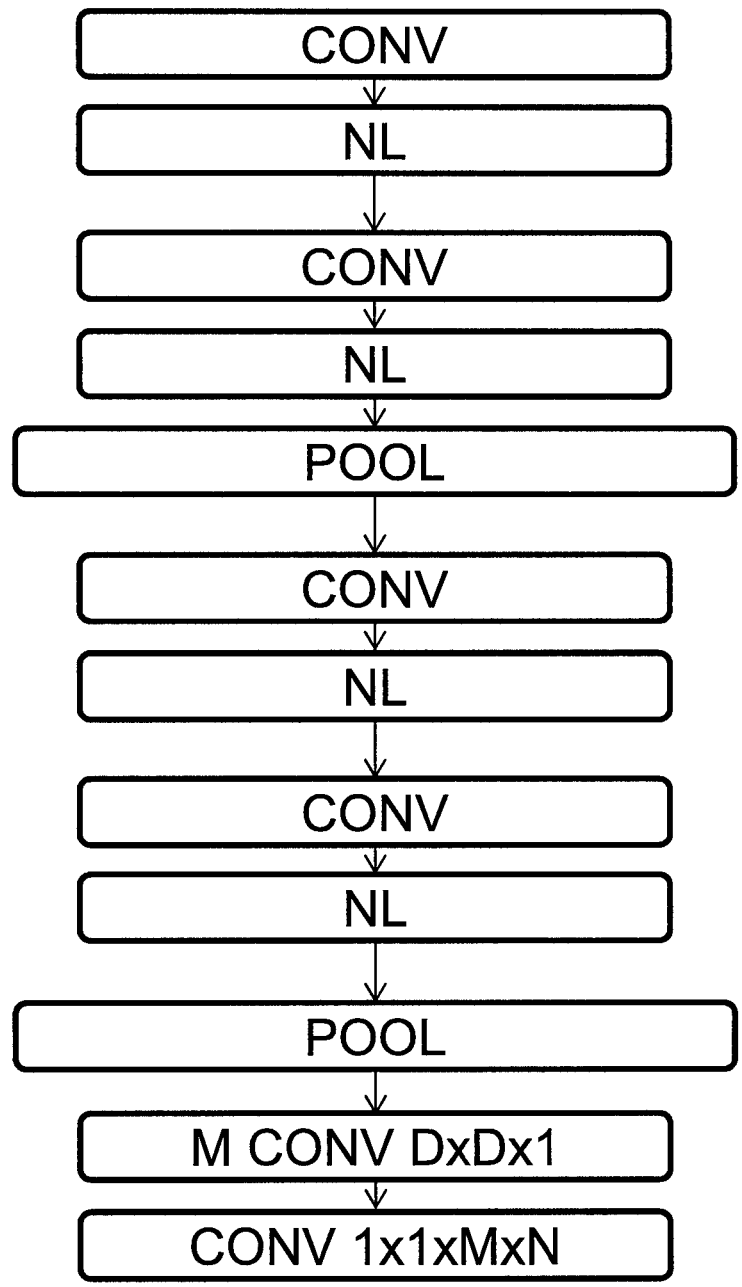
Figure 2C:
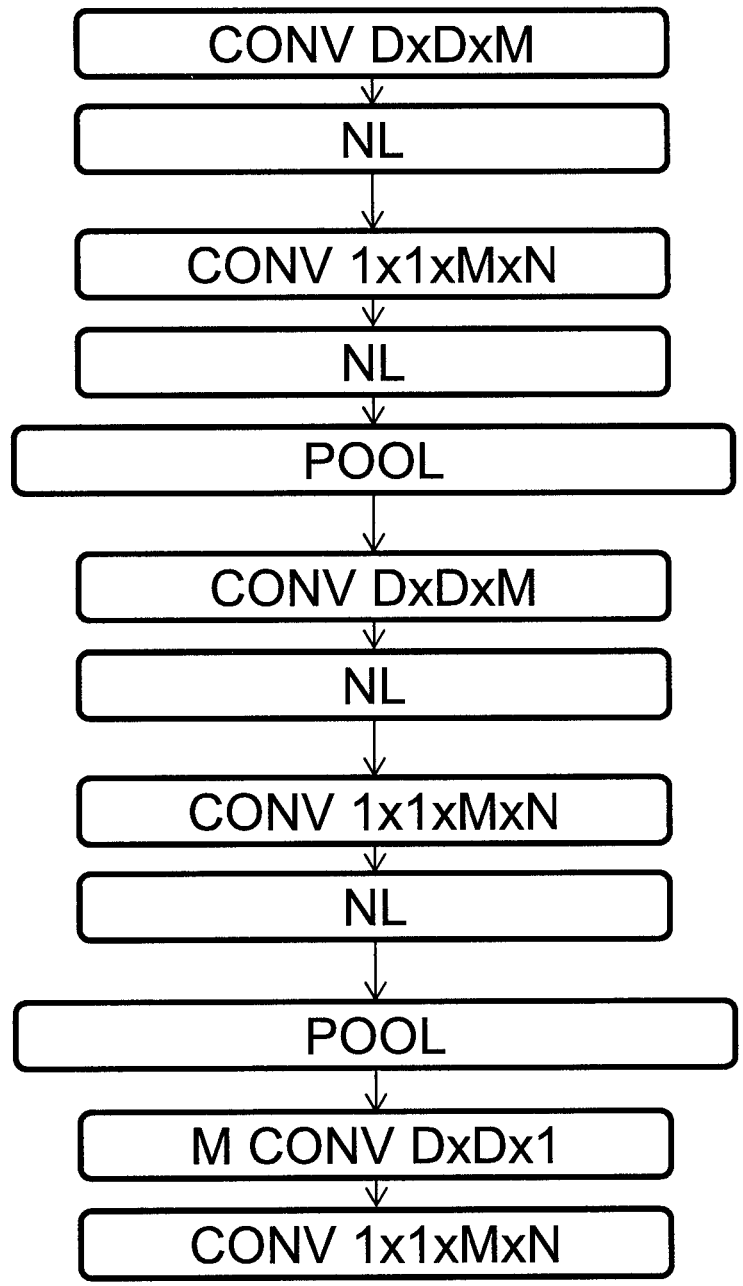

Other features and advantages of the present invention will become apparent upon reading the following description of a preferred embodiment. This description will be given with reference to the appended drawings in which:

FIG. 1 is a diagram of an architecture for the implementation of the methods according to the invention FIGS. 2a-2c show three examples of respectively known convolutional neural networks, in accordance with a first embodiment of the invention, and in accordance with a second embodiment of the invention.

DETAILED DESCRIPTION

Architecture

According to two complementary aspects of the invention, are proposed:
- a method for learning parameters of a convolutional neural network (CNN) for data classification; and
- a method for classifying an input datum using a CNN, advantageously learned thanks to the first method.

These two types of methods are implemented within an architecture as represented by FIG. 1, thanks to a server 1 and a terminal 10. The server 1 is the learning device (implementing the first method) and the terminal 2 is a classification device (implementing the second method). It is quite possible that these two devices are confused, but the present invention is particularly distinguished in the case where the terminal 2 is a device of an insecure user, such as a smartphone or a touch pad.

Indeed, a "white box" classification method is proposed, which is intended to be implemented by a device that does not particularly have a secure hardware and that can be subject to attacks on hardware implementation, and for which the white box approach takes all its interest.

In all cases, each device 1, 2 is typically a remote computer device connected to a wide area network 10 such as the internet network for data exchange. Each comprises data processing means 11, 21 of the processor type, and at least the terminal 2 has data storage means 22 such as a generally insecure computer memory, for example a flash memory.

The server 1 can also have a memory 12, for example a hard disk, for storing said learning database, i.e. a set of already classified data (as opposed to the data called input data that are precisely to be classified).

The users of the terminals 10 are typically "clients", in the commercial sense, of the server 1 operator.

Indeed, the input or learning data are advantageously representative of images (said classification being an object recognition), and there is an example in which the terminal 1 is a smartphone comprising a front camera, and the user wants the classification of the (potentially confidential) images taken by the camera.

CNN

A CNN generally contains four types of layers successively processing information:
- the convolution layer which processes blocks of the input one after the other;
- the non-linear layer which allows adding non-linearity to the network and thus having much more complex decision functions;
- the pooling layer which allows grouping several neurons into a single neuron;
- the fully connected layer which connects all the neurons of a layer to all the neurons of the previous layer.

The non-linear layer activation function NL is typically the ReLU (Rectified Linear Unit) function which is equal to f(x)=max(0, x) and the most used pooling layer (noted POOL) is the MaxPool2×2 function which corresponds to a maximum between four values of a square (four values are pooled into one).

The convolution layer, noted CONV, and the fully connected layer, noted FC, generally correspond to a scalar product between the neurons of the previous layer and the weights of the CNN.

The typical CNN architectures stack a few pairs of layers CONV→NL and then add a layer POOL and repeat this scheme [(CONV→NL)$^p$→POOL] until an output vector of sufficiently small size is obtained, then finish with two fully connected layers FC.

Here is a typical CNN architecture (an example of which is shown in FIG. 2a):

INPUT→[[CONV→NL]$^p$→POOL]$^n$→FC→FC

Within the context of the present invention, easily "white-box" CNN-specific architectures will now be described.

Learning Method

According to a first aspect, the learning method implemented by the means for processing data 11 of the server 1 is proposed.

In a step (a1), from said already classified learning database, the first server learns the parameters of a specific CNN called quantized CNN. A quantized CNN is such that said parameters are valued in a discrete space, in other words can take a limited number of values. This is opposed to the conventional CNNs in which the parameters are real, for example between 0 and 1.

Preferably, the parameters are valued in a space $\{0; 1\}^n$ that will be noted $\mathbb{F}_2^n$, with n≤8, that is to say we work on quantizations on a limited number of bits. If n=8, the parameters have a size of one octet (a "byte" of 8 bits). If n=4, the parameters have a size of a semi-octet (a "nibble" of 4 bits). If n=1, the parameters have a size of one bit (they are only 1 or 0).

Preferably, n is equal to 1, 2 or 4. A quantized CNN where the parameters are valued in $\{0; 1\}$ is called a binary CNN, and such CNN will be particularly preferred.

The use of such quantized or even binary CNNs is known for platforms with limited computing resources. Quantized CNNs have lower performances but are close to CNNs without quantization.

The person skilled in the art can consult in this regard the documents:

Shuchang Zhou, Zekun Ni, Xinyu Zhou, He Wen, Yuxin Wu, Yuheng Zou: *DoReFa-Net: Training Low Bitwidth Convolutional Neural Networks with Low Bitwidth Gradients;*

Mohammad Rastegari, Vicente Ordonez, Joseph Redmon, Ali Farhadi: *XNOR-Net: ImageNet Classification Using Binary Convolutional Neural Networks.* ECCV (4) 2016: 525-542;

Wei Tang, Gang Hua, Liang Wang: *How to Train a Compact Binary Neural Network with High Accuracy?* AAAI 2017: 2625-2631;

Anwar, S., Hwang, K., Sung, W.: *Fixed point optimization of deep convolutional neural networks for object recognition.* In: *Acoustics, Speech and Signal Processing (ICASSP)*, 2015 IEEE International Conference on, IEEE (2015) 1131-1135.

Furthermore, preferably, in addition to being quantized, the present CNN is of the "fully convolutional" type, that is to say it does not comprise a fully connected FC layer. To reformulate, the quantized CNN comprises only convolution CONV, non-linear NL, and pooling POOL layers. Optionally, batch normalization layers (BN) may still be present.

At each layer, the CNN works on the entire size of the input datum. The fully convolutional CNNs are used for example in image analysis where they provide a very high processing quality, to the extent that all layers work on the entire image.

The features of fully convolutional CNN will be discussed in greater detail later, but the person skilled in the art can consult in this regard the document Jonathan Long, Evan Shelhamer, Trevor Darrel: *Fully Convolutional Networks for Semantic Segmentation.*

It may seem paradoxical to combine the quantized aspect with the fully convolutional aspect, to the extent that these properties have opposite goals in terms of performances. However, these properties also have the effect of decreasing respectively the size of the parameters and the number of parameters. Together, this greatly reduces the size of the tables needed to at least partially whiten the CNN, and makes a white box operation possible on standard hardware such as a Smartphone.

To explain this, the operation of a convolution layer will be discussed in greater detail later. The latter extracts features of an input datum by filtering, and combines them to generate an output datum of the layer, for example an image. We refer to input/output "volumes" because an input/output depth is defined as a third dimension. In general, an input/output volume of depth k can be defined as a set of k channels, which are often referred to as "features maps". For example, an initial datum such as an image has a depth of 3 if we consider the 3 features maps correspond to the 3 RGB colors.

The convolution layer does not process the whole input datum at once, but only "block-by-block". The basic spatial element, which defines the size of a block and which will be moved on the input volume, and the size of which corresponds to that of the filter of the layer, is called a "receiver field". The number of filters applied defines the output depth.

In summary, a standard convolution layer is parametrized by a "core" of size D×D×M×N where D is the spatial width of the receiver field (it is most often a square of 3 pixels on sides) M is the input depth (the number of features maps) and N is the output depth.

The output depth gradually rises as we go along the layers, and 512 or even 1024 features maps are commonly reached. Simultaneously, the spatial size of the features maps decreases as we go along the layers (for example, we finish at 3×3).

Thus, a fully connected FC final layer is used, which combines all the final features maps into a single classifier. The filter associated with the FC layer is therefore gigantic, for example of size 1024×128, and uses a significant part of the set of the CNN parameters.

Using the numbers above, if the FC layer is replaced with M 3×3×1 convolution layers plus a 1×1×1028×128 convolution layer, the number of parameters involved is practically divided by nine.

FIG. 2b shows an example of a preferred fully convolutional CNN of architecture: INPUT→[[CONV→NL]$^p$→POOL]$^n$→M CONV D×D×1→CONV 1×1×M×N In a particularly preferred manner, the number of weights and their size can be further reduced by using "separable convolutions" as presented in document Andrew G. Howard, Menglong Zhu, Bo Chen, Dmitry Kalenichenko, Weijun Wang, Tobias Weyand, Marco Andreetto, Hartwig Adam: *MobileNets: Efficient Convolutional Neural Networks for Mobile Vision Applications.*

The idea is to replace each convolution D×D×M×N with a succession of a first convolution D×D×M called "depthwise" convolution (applying a single filter to each input feature map) and of a second convolution 1×1×M×N called "pointwise" convolution (combining the outputs of the first convolution). A layer NL can be added between the two convolutions. In practice, such separation of convolutions can still allow dividing the number of parameters sevenfold.

FIG. 2c represents an example of a preferred CNN with separable convolutions of architecture: INPUT→[[CONV D×D×M→NL→CONV 1×1×M×N→NL]$^p$→POOL]$^n$→M CONV D×D×1→CONV 1×1×M×N. Note that the values D, M, and N vary depending on the layer.

In a step (a2), the data processing means 21 generate a white-box implementation of at least one layer of said quantized CNN, said white-box implementation being predetermined based on at least one of said learned parameters.

It is recalled that by white-box implementation of an operation is meant a representation of the operation that does not allow going back to the internal states or to the parameters when the operation is executed (by application of the white-box implementation to the input data), in particular a table (we refer to tabulated representation).

This means that the operation associated with said white-box layer is represented by a predefined table within which the parameter(s) (those learned and the hyper-parameters) are "buried".

The expected properties of the application whitening mean that the observation of the execution of the white-box implementation should not allow finding the values of the parameters buried in the calculation.

Preferably, at least the convolution layer(s) is/are the subject of a white-box implementation, then the pooling layer(s), and finally the non-linear layer(s). Note that a set of layers, or even the whole CNN, can be the subject of a unique white-box representation, but in order to reduce the size of the tables, the inputs of a layer can be cut.

Preferably, at least two consecutive layers are the subject of a white-box implementation. Thus, artificial layers that have no effect can be added whenever possible at the input and output of tables; for example, if $T_1$ and $T_2$ are the tables representing two successive layers, $T_1 \circ T_2$ is replaced with $(T_1 \circ P) \circ (P^{-1} \circ T_2)$ where P is a bijective internal encoding drawn at random. This allows "hiding" the internal states of the CNN, since the values $T_1 \circ P(x)$ and $P^{-1} \circ T_2(y)$ alone provide no information on the parameters buried in the tables $T_1$ and $T_2$.

The person skilled in the art will be able to consult, as regards the white-box implementations, the documents:
Stanley Chow, Philip A. Eisen, Harold Johnson, Paul C. van Oorschot: *A White-Box DES Implementation for DRM Applications. Digital Rights Management Workshop* 2002
Stanley Chow, Philip A. Eisen, Harold Johnson, Paul C. van Oorschot: *White-Box Cryptography and an AES Implementation. Selected Areas in Cryptography* 2002
Brecht Wyseur, *"White-Box Cryptography"*, PhD thesis, Katholieke Universiteit Leuven, 2009

These documents relate to cryptographic functions, but the person skilled in the art will be able to transpose their teaching to layers of CNNs.

Classification Method

According to a second aspect, there is provided the method for classifying an input datum, implemented by means for processing data 21 of the terminal 2.

The classification method comprises three main steps: in a first step (a) is implemented the learning of a quantized CNN as defined above, in a second step (b) the white-box implementation generated for this CNN is stored on the means for storing data 22 of the terminal 2, and in a third step (c) the means for processing data 21 of the terminal 2 classify said input datum, by means of the quantized CNN, by applying said white-box implementation.

It is thus possible to use the CNN, without the parameters and hyperparameters buried in the white-box implementation being accessible.

Computer Program Product

According to a third and a fourth aspects, the invention relates to a computer program product comprising code instructions for the execution (in particular on means for processing data 21, 22 of the server 1 or of the terminal 2) of a method, according to the first aspect of the invention, for learning parameters of a CNN or a method, according to the second aspect of the invention, for classifying an input datum, as well as storage means readable by a computer device (a memory of the server 1 or of the terminal 1) on which this computer program product is found.

The invention claimed is:

1. A method for learning parameters of a convolutional neural network, CNN, for data classification, the method comprising the implementation, by means for processing data of a server, steps of:
learning, from an already classified learning database, the parameters of a quantized CNN, wherein said parameters are n-bit integers, and the quantized CNN does not comprise a fully connected layer;
generating a white-box implementation of at least one layer of said quantized CNN, said white-box implementation being predetermined based on at least one of said learned parameters.

2. The method according to claim 1, wherein the parameters of the quantized CNN are valued in space $\{0; 1\}^n$ with $n \leq 8$.

3. The method according to claim 2 wherein n is equal to 1, 2 or 4.

4. The method according to claim 1, wherein the quantized CNN comprises at least one convolution layer, said white-box implementation is a white-box implementation of at least one convolution layer.

5. The method according to claim 4, wherein the quantized CNN further comprises a non—linear layer following the convolution layer, said white-box implementation is a white-box implementation of at least one convolution layer and one non— linear layer.

6. The method according to claim 4, wherein the quantized CNN is a CNN with separable convolutions, and comprises first convolution layers implementing a single filter per input channel, and second convolution layers each combining the outputs of a first convolution layer.

7. A method for classifying an input datum, comprising:
storing, on means for storing data of a terminal, a white-box implementation of at least one layer of a quantized convolutional neural network, CNN, which parameters are n-bit integers, and the quantized CNN does not comprise a fully connected layer, said white-box implementation being predetermined based on at least one of said parameters;
classifying, by means for processing data of the terminal, said input datum, by means of the quantized CNN, by applying said white-box implementation.

8. A method for classifying an input datum comprising the steps of:
storing, on means for storing data of a terminal, a white-box implementation of at least one layer of a quantized convolutional neural network, CNN, which parameters are n-bit integers, said white-box implementation being predetermined based on at least one of said parameters;
classifying, by means for processing data of the terminal, said input datum, by means of the quantized CNN, by applying said white-box implementation comprising a prior step of learning said quantized CNN in accordance with the method according to claim 1.

9. A non-transitory computer-readable program product comprising code instructions for the execution of a method according to claim 1, for learning parameters of a convolutional neural network, CNN, when said program is run on a computer.

10. A non-transitory storage means readable by a computer device on which a computer program product comprises code instructions for the execution of a method according to claim 1, for learning parameters of a convolutional neural network, CNN.

11. A non-transitory computer program product comprising code instructions for the execution of a method, according to claim 7, for classifying an input datum, when said program is run on a computer.

12. A non-transitory storage means readable by a computer device on which a computer program product comprises code instructions for the execution of a method according to claim 7, for classifying an input datum.

* * * * *